United States Patent Office 3,191,691
Patented June 29, 1965

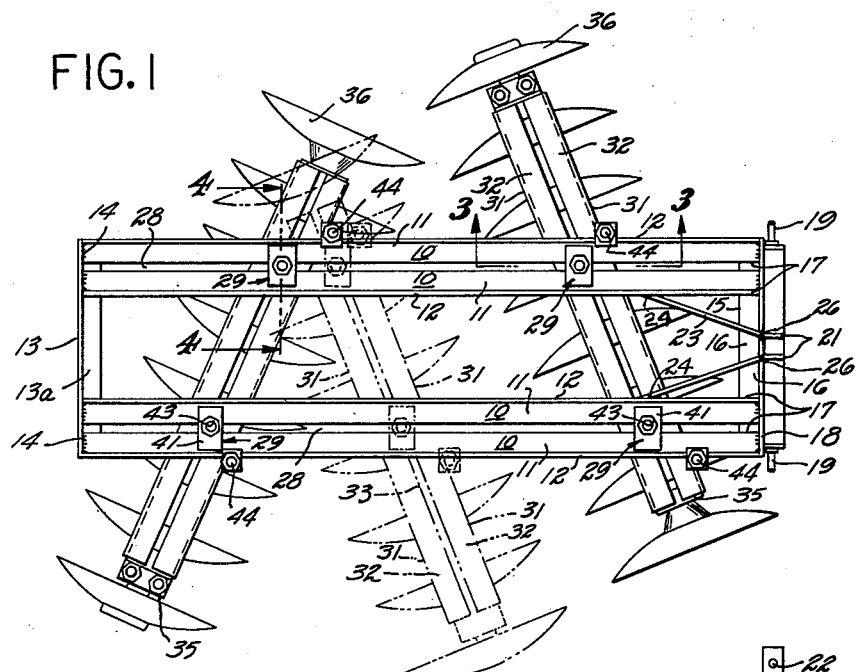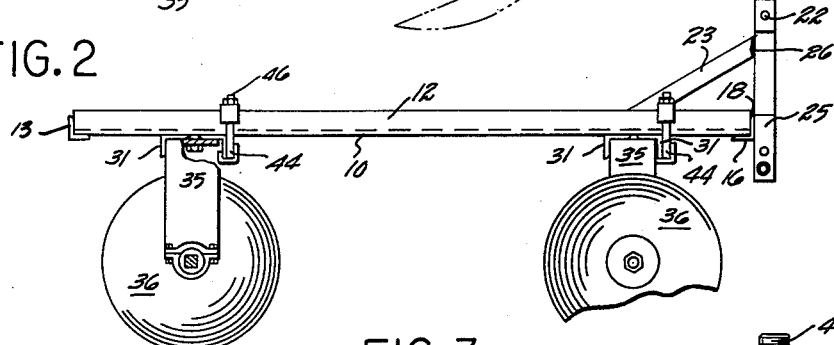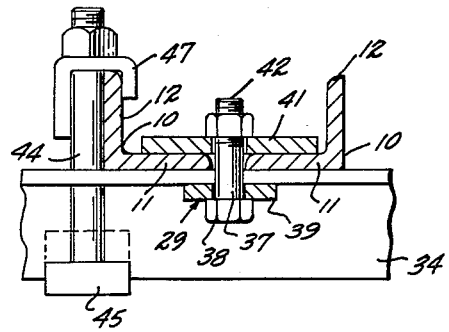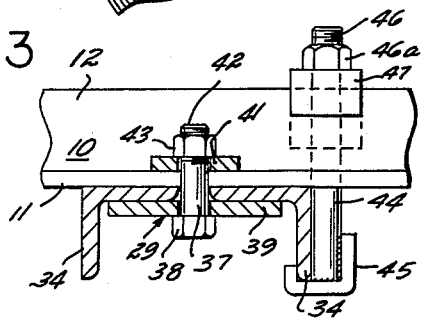
INVENTOR.
CLARENCE E. NEWKIRK
BY
George Douglas Jones,
ATTORNEY

3,191,691
IMPLEMENT FRAME AND A TOOL CARRYING MEMBER AND MEANS FOR SECURING THE TWO
Clarence E. Newkirk, 227 N. Emily St., Anaheim, Calif.
Filed Sept. 30, 1964, Ser. No. 400,541
5 Claims. (Cl. 172—776)

This invention is directed to the carrying frame members for earth working tools or implements, said frame members operatively functioning by and with the well known Three Point or A type Hitch, the mechanism of which is powered by a prime mover, better known as a tractor, the hitch and mechanism therefore is illustrated, described and claimed in my copending application S.N. 373,165, filed June 8, 1964.

The hitch will for convenience hereinafter be referred to as the A type hitch.

The principal object of the present invention is directed to solving and simplifying the ever present need for fine and accurate adjustments of the earth working tools in their relation to the implement carrying frame member, and the means of rigidly securing said earth working tools to said carrying frame member. One of the most important settings of the tools is that of the well known implement of the disc harrow, which comprises a plurality of disc members secured in spaced apart rotatable relation, and the said gangs of discs set at various divergent angles, to meet and function in all of the various requirements of the varying soil types.

A further object of this invention is the ease of setting the several angles of adjustment as required, and by reducing the time and labor to complete an excellent job of accurate implement setting.

A still further object of this invention is the adjustment of what is known in this art as off-setting the gangs of discs to any desired position, either to the right or to the left as occasion may require.

All of the setting is accomplished through the medium of sliding the gangs or earth working tool members to the desired angle and securing the same in that predetermined rigidly secured position.

These and other objects will appear from the following description and the accompanying drawings, which for reasons of clarity in describing the essential elements of this invention is illustrated with disc gangs for the earth working members.

In the drawings:

FIGURE 1 is a top plan view of the present invention illustrating the novel frame construction, the angular position of the tools or gangs and their setting, together with the position of the securing means.

FIGURE 2 is a side elevational view of the implement carrying frame and illustrating the mounting and securing means of the gang members to the implement carrying frame.

FIGURE 3 is a sectional view of the mounting and securing means of the gangs to the main frame taken on line 3—3 of FIG. 1.

FIGURE 4 is a rear sectional view of the mounting and securing means taken on line 4—4 of FIG. 1.

Referring now to the drawings by numerals of reference wherein like numerals refer to like parts.

The frame members comprising the implement carrying frame is best illustrated in FIG. 1, of the drawings, which includes spaced apart elongated angle members referred to by the numeral 10, which are formed as right angle members in the shape of the letter L in cross section the horizontal portion of the L forming the base portion of the angle as indicated at 11, 11, and positioned in longitudinal horizontal relation to the ground surface, and the vertical portion of the L forming the legs 12, 12, and positioned in vertical relation to the ground surface.

The base members 11, 11 are positioned in secured relation forming an elongated open channel 28, therebetween.

The rear angle member 13 is positioned in transverse relation to the members 10, 10, and provide the rear securing member, and having its base portion 13a in abutting relation with the base portion 11, 11, and the leg portions in abutting relation with the frame legs 12, 12, and secured thereto by weld means 14, 14.

The forward end portions of the angle members 10, 10 are secured to a transverse member 15, the base portion thereof is in abutting relation with the base members 11, 11 of implement frame and secured thereto preferably by weld means 17, 17.

The leg 18 of the transverse angle member 15 has secured thereto the A portion of the A type hitch, the legs 25, 25 of which are secured in spaced apart relation preferably by weld means not shown. Axle members 19, 19, positioned in transverse relation to the implement frame and secured to the transverse angle member 15, or, they may be a part of the legs 25, 25. The axles 19, 19 are arranged for connection to the conventional draft members of the A type hitch which extend rearwardly from the tractor and operatively functioning the movement of the implement frame, that is, the raising and the lowering of the same.

The apex of the A of the hitch are positioned in spaced apart relation at 21, 21, and having pivot connecting means 22, with the third arm, not shown, of the conventional A type hitch.

Brace means 23, 23, secured to the legs 12, 12, by weld means 24, 24, and secured to the hitch leg members by weld means 26, 26 at a point adjacent the apex of said hitch legs 25, 25.

It should be noted that the base members 11, 11, of the angle members 10, 10, are positioned in spaced apart relation providing an open channel 28, 28, which forms an open run-way for securing bolt 37, to be moved when adjustments are made.

Disc gang members 31, 31, formed of L shaped angle members the base portion 32, 32, are positioned in horizontal relation to the ground surface and are in spaced apart relation forming an open channel 33, therebetween, the legs of the angle members 34, 34 are positioned in depending vertical position, and the base portion of said members 32, 32 are in abutting position with the base members 11, 11.

The end portions of the gang frame members 31, 31 have secured thereto depending members 35, 35, which in turn support the bearing members 35a, carrying the axles of the soil working disc members 36.

The slidable securing means 29 includes the bolt member 37, having an enlarged head portion 38, positioned in abutting relation with the plate 39, which in turn abuts the underside of the base members 32, 32. The body of the bolt member 37 projects through the open channel 33, 33, said channel forming a track-way between the base members 11, 11, for the bolt member 37 to be guided therein when adjustments are being made, the said bolt 37 further projecting through an opening in the plate 41. It should be noted that the plate 41 is in juncture relation with inner surface of the legs 12, 12 to maintain alinement of the slidable securing means 29 with the carrying frame members 10, 10. The bolt 37, having a screw threaded end portion 42, which carries a nut 43, the function of which secures the members 32, 32, to the underside of the base members 11, 11 in rigid fixed position.

A J bolt 44, one end of which is formed in U shape 45, the opposite end of the bolt having a screw threaded portion 46, over which is placed an inverted U shaped clip member 47, and a nut 46a, over the screw threaded portion 46.

The J bolt 44 clamps the depending leg 34 of the gang frame members 31, 31, and carries the inverted U clip member 47, which is positioned over the upstanding leg 12, 12 of the frame members 10, 10, to rigidly secure the gang members in doubly secured relation having its base portion 32, 32 in abutting secured relation to the base members 11, 11 of the frame members 10, 10.

For convenience in describing the adjustments and construction of this invention the reference numerals in the several figures of the drawing will be used.

In setting the disc gangs, raise the implement frame through the use of the A type hitch, in order to clear the earth working members from the soil surface. Then loosen nut 46a, of the J bolt assembly and the nut 43 of the bolt 37 should likewise be loosened.

The disc gang frames 31, 31 are now in moveable relation with the carrying frame members 10, 10. The gangs may now be moved to any desired angle required for the type of soil in which the implements are to be operated. Note the angle of the gang in dash and dot lines in FIG. 1 of the drawings.

It is obvious therefore that one gang may be offset to extreme angles in relation to the other gangs, and may be offset to move the gangs either to the right or to the left to permit extreme projection required to work under trees in orchards, etc.

Normal means of making adjustments of earth working tools or implements is to provide punched or drilled walled openings in the frame structure, and the position of these walled openings limits the movement of the distance between said openings, which in most cases is insufficient for correct or desired adjustment, as only half an inch or less may be all the movement required to give the accurate desired angle for the soil cut, as well as being able to quickly adjust the gangs or tool hangers for side draft, which is indeed a most important adjustment.

One of the most important features of frame construction for earth working tools is the necessity for using solid beam members which were originally used on horse drawn implements such as a plow and other implements. Some manufacturers have attempted to incorporate such members in modern tool and implement frame design, but have found that with the use of high powered tractors it was necessary to increase the heft of the beams and frame to prevent bending and breaking of the same.

It is therefore quite obvious that the present invention has developed a design for earth working implements that permits light weight members to be used, producing a rigidity that would require a terrific size and weight when solid beams of the same weight would fail.

Having described only a typical preferred form and application of my invention, I do not wish to be limited or restricted to the specific details herein set forth, but wish to reserve to myself any variation or modification that may appear to those skilled in the art or fall within the scope of the appended claims.

What I claim is:

1. Securing means for pairs of members L shaped in cross section, one pair forming an implement carrying frame structure wherein, the horizontal portion of the L is a base member and the vertical portion of an L the upstanding leg member, the pairs of members being secured in free base edge to free base edge relation but in spaced apart relation form an open channel therebetween, a second pair of L shaped in cross section angle members forming part of an implement gang frame structure, wherein the horizontal portion of the L is a base member and the vertical portion of this L a depending leg member, the pair of members being secured in free base edge to free base edge relation but in spaced apart relation to form an open channel therebetween, both of the open channels providing a guiding track means to secure the implement carrying frame structure to the gang frame structure, said securing means including a headed bolt member, the opposite end thereof having a screw threaded portion and a screw threaded nut therefor, a first plate member positioned in abutting relation with the underside of the bolt head, said bolt projecting through the open channel of the implement carrying frame structure and through the open channel of the gang structure, the gang structure base portion positioned in juncture relation with the under side of the implement carrying frame structure base member, the open channels being positioned in register, and a second plate through which the bolt projects, is positioned on the upper side of the implement carrying frame structure base members, said open channels forming a track and guiding means for said bolt, the bolt nut securing said plates in intimate relation thereby providing rigid connection of the implement carrying frame structure and the gang structure.

2. In an earth working implement carrying frame, including pairs of elongated spaced apart members L shaped in cross section, one paid forming an elongated frame wherein, the upstanding portion of the L forms the leg member, the horizontal portion of the L forming the base member and positioned in a horizontal plane to the ground surface, and the leg member in upstanding vertical position to the ground surface, earth working ground engaging units forming a gang frame structure including spaced apart members L shaped in cross section in secured spaced apart relation forming an open channel therebetween said gang frame carrying soil working tools, the horizontal portion of the L forming the base member and the vertical portion of the L in depending position forming the leg member, the base member in horizontal relation to the ground surface, the leg member in vertical depending position to the ground surface, said gang base members upper surface positioned in juncture relation with the under-surface of the base members of the implement carrying frame, said frame members having their free base to free base edge members positioned in spaced apart secured relation forming an open channel therebetween said implement carrying frame and the gang frame open channels being placed in register, adjustable securing means positioned between the base members and through the open channel permitting controlled slidable movement between the carrying frame and the gang frame for angular adjustment thereof, said securing means providing rigid attachment of the implement carrying frame and the gang frame structure.

3. A structure in accordance with claim 2, wherein the leg portions of the L shaped in cross section angle members are secured in rigid fixed relationship by means of a J bolt, having a screw threaded end portion and a screw threaded nut therefor, said J bolt positioned over the depending leg member of the gang member and a U shaped member in depending position placed over the upstanding leg member of the carrying frame structure, said bolt projecting through the base of said U shaped member, said legs being rigidly secured by means of the J bolt nut in screw threaded relation with the screw threaded end portion of the J bolt, and abutting the outer base of the depending U shaped member.

4. Securing means, including plate members carried by a bolt member having a headed portion and a threaded portion, said bolt being positioned through an open channel provided by pairs of L shaped in cross section angle members forming a frame structure, the short leg of the L being positioned in horizontal relation to the ground surface and forming the base member, and the long portion of the L the upstanding leg member being in vertical relation to the ground surface, a similar pair of L shaped in cross section angle members forming an implement gang frame structure, the leg of the second mentioned pair of L shaped in cross section members positioned in depending relation to the ground surface, the horizontal portion forming the base member, the base member of the first mentioned angle members having the underside of the base member in abbutting relation with the upper side of the second mentioned gang structure base member, aforesaid bolt having a plate member positioned over the same and abutting the underside of the bolt head and said bolt protruding through the open channel and a second plate through which the bolt projects, said plate positioned on the upper surface of the base member of L shaped in cross section the first mentioned pairs of angle members, a nut in screw threaded relation with the screw threaded bolt end, whereby the L shaped in cross section angle members forming a frame structure and the gang structure members are in slidable adjustable relation therewith and upon tightening said nut by screw threaded means into contact with the last mentioned plate, said structures are secured in rigid fixed position.

5. Securing means for pairs of L shaped in cross section angle members forming an implement carrying frame structure, said means including a headed bolt and nut therefor said bolt carrying a pair of plates, and a J bolt and nut carrying an inverted U member, the horizontal portion of the L forming the base member, and the verticle portion of the L the leg member of the implement carrying frame structure, the pairs of L shaped in cross section angle members positioned and secured in free base edge to free base edge, but in spaced apart relation forming an open channel therebetween providing a trackway, a second pair of L shaped in cross section angle members formed as an implement gang frame structure, the horizontal portion of the L forming the base member and the vertical portion of the L in depending position the leg member, said base members positioned in free base edge to free base edge relation and the open channels of the implement carrying frame and implement gang structure being in register, said securing means headed bolt member the opposite end of which has a screw threaded portion and a screw threaded nut therefor, a first plate member positioned in abutting relation with the underside of said bolt head, and said bolt projecting through the open channel and said plate in abutting relation with the underside of the gang structure base member, a second plate positioned over the bolt and in abutting relation with the upper side of the base members of the implement carrying frame structure, said bolt and nut securing the plates in intimate contact with the base members, securing the angle members, base members, in rigid fixed relation, and said J bolt and nut therefor, the arc of the J hooked over the depending leg member of the gang structure, and a depending U member positioned over the upper portion of said J bolt and over the leg of the first mentioned L shaped in cross section angle members, the said J bolt and nut securing said upstanding and depending legs in rigid non-bendable relationship.

References Cited by the Examiner

UNITED STATES PATENTS

| 1,247,017 | 11/17 | Sharp | 172—310 |
| 1,634,650 | 7/27 | Coon | 172—581 X |
| 2,970,657 | 2/61 | Toland | 172—596 X |
| 3,080,933 | 3/63 | Kramer et al. | 172—582 |

FOREIGN PATENTS

| 986,380 | 7/51 | France. |
| 256,220 | 2/31 | Germany. |

ABRAHAM G. STONE, *Primary Examiner.*

T. GRAHAM CRAVER, *Examiner.*